(12) United States Patent
Hessling et al.

(10) Patent No.: US 6,572,304 B1
(45) Date of Patent: Jun. 3, 2003

(54) DEVICE FOR FIXING A FIRST PART TO A FIXED SECOND PART

(75) Inventors: Andre Hessling, Werl (DE); Bruno Jansa, Hamburg (DE); Christian Riedel, Bliedersdorf (DE); Claus-Dieter Meissner, Buxtehude (DE); Roderich Thometschek, Stockelsdorf (DE)

(73) Assignees: Hella KG Hueck & Co., Lippstadt (DE); Daimler Chrysler Aerospace Airbus GmbH, Hamburg (DE); Draeger Aerospace Gmbh, Luebeck (DE)

( * ) Notice: Subject to any disclaimer, the term of this patent is extended or adjusted under 35 U.S.C. 154(b) by 0 days.

(21) Appl. No.: 09/623,566

(22) PCT Filed: Dec. 27, 1999

(86) PCT No.: PCT/DE99/04100

§ 371 (c)(1),
(2), (4) Date: Nov. 17, 2000

(87) PCT Pub. No.: WO00/40436

PCT Pub. Date: Jul. 13, 2000

(30) Foreign Application Priority Data

Jan. 7, 1999 (DE) ........................................ 199 00 267

(51) Int. Cl.⁷ ................................................ F16B 21/00
(52) U.S. Cl. .................. 403/321; 403/322.1; 244/118.5
(58) Field of Search ................. 403/321, 322.1, 403/322.3, 322.4, 323, 325; 244/118.5; 411/552, 549, 377, 372.5; 292/256.71, 256.73; 248/231.51, 228.4, 291.1; 52/39, 28; 296/37.8

(56) References Cited

U.S. PATENT DOCUMENTS 4,385,851 A * 5/1983 Bellamy ..................... 403/406

FOREIGN PATENT DOCUMENTS

| DE | 1553593 | | 6/1969 | | |
|---|---|---|---|---|---|
| DE | 7407133 | | 7/1974 | | |
| DE | 3537135 | | 4/1987 | | |
| DE | 3923444 | | 1/1991 | | |
| DE | 39 23 444 | * | 1/1991 | ........... | B60R/11/00 |
| DE | 19730269 | | 1/1999 | | |
| DE | 197 30 269 | * | 1/1999 | ............. | F16B/5/02 |

OTHER PUBLICATIONS

Mecano–Simmonds GMBH, Speed–Nuts, pp. 21–1 through 21–3, 1969.

Brief Translations for Mecano–Simmonds GMBH, Speed––Nuts, pp. 21–1 through 21–3, 1969, DE 1553593 and DE–GM 7407139.

PCT International Search Report.

* cited by examiner

*Primary Examiner*—Lynne H. Browne
*Assistant Examiner*—Michael P. Ferguson
(74) *Attorney, Agent, or Firm*—Birch, Stewart, Kolasch & Birch, LLP

(57) ABSTRACT

A device is provided for fastening a first part to a stationary second part, in particular to a part of a vehicle, having a fastening element which can be connected to the first part and has at least one locking element arranged so it cannot be lost, such that it can be brought into a locked position where the first part is joined to the second part and it can also be brought into an unlocked position where the first part is released from the second part, where the fastening element has a top part facing the second part and a bottom part facing the first part, where the top part and the bottom part are designed to pivot about a pivot axis, and the locking element is mounted on the top part.

21 Claims, 6 Drawing Sheets

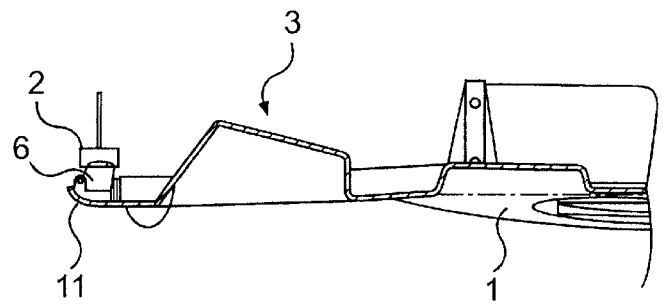
FIG. 3
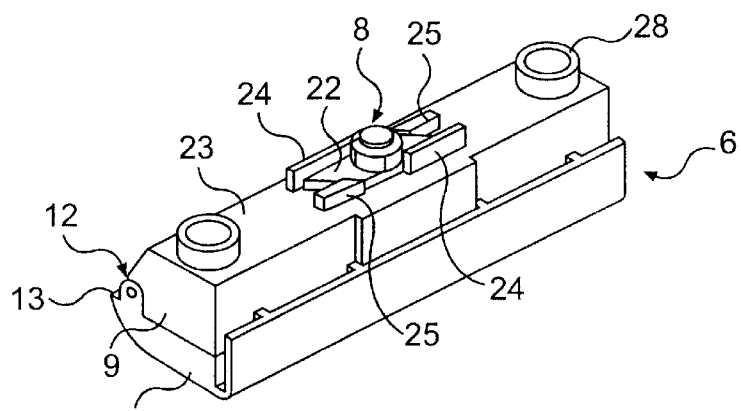
FIG. 4
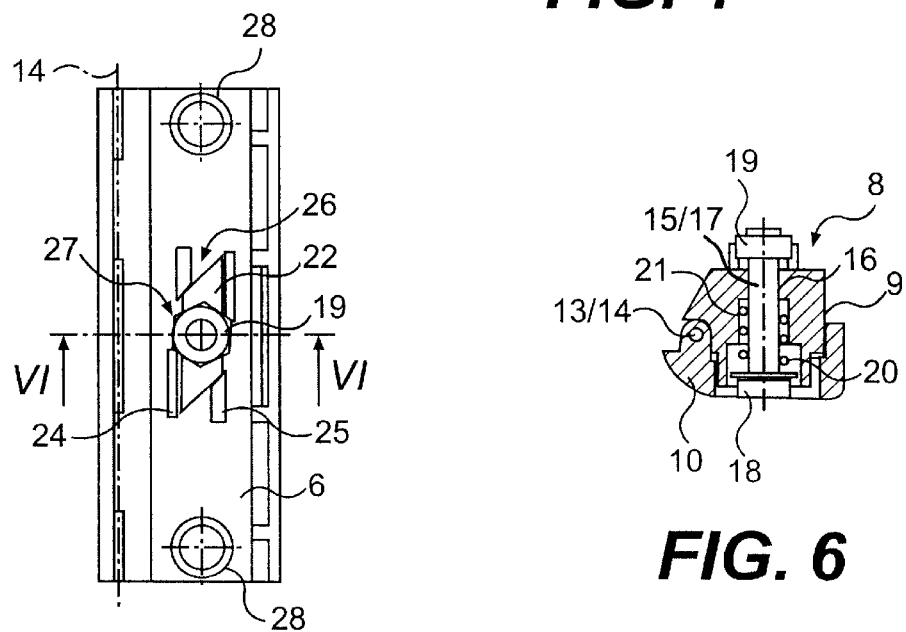
FIG. 5
FIG. 6

DEVICE FOR FIXING A FIRST PART TO A FIXED SECOND PART

CROSS REFERENCE TO RELATED APPLICATIONS

This application is the national phase under 35 U.S.C. §371 of PCT International Application No. PCT/DE99/04100 which has an International filing date of Dec. 27, 1999, which designated the United States of America.

FIELD OF THE INVENTION

The present invention relates to a device for fastening a first part to a stationary second part, in particular to a part of a vehicle, having a fastening element which can be connected to a first part and has at least one fixedly arranged locking element that can be brought into a locked position connecting the first part to the second part and can be brought into an unlocked position releasing the first part from the second part.

BACKGROUND OF THE INVENTION

German Patent Application 197 30 269.6 discloses a device for fastening a first part to a stationary second part, where a one-piece fastening element that can be connected to the first part is provided. A locking element attached to the fastening element so it cannot be lost is provided with the fastening element; by means of this locking element, the fastening element can be detachably mounted on the second part together with the first part. The fastening element has a mounting web which is mounted by means of a plug clamp on a projecting web of the first part. Before locking the first part on the second part, it is desirable to guarantee accessibility to the rear side of the first part so that the devices attached to the first part, in particular air jet, and reading lights, can be attached. To this end, a clamp-like mounting arm is provided on the side of the first part opposite the fastening element so that it can be placed on the edge of the second part. The edge of the second part thus forms a supporting face for the mounting web of the first part, which permits an open position of the first part perpendicular to the extent of the second part. However, one disadvantage of the known device is that unwanted loosening of the first part from the second part can occur due to the loose seating of the mounting web of the first part on the edge of the second part. In addition, the first part can be mounted on only one side of the second part and it can be pivoted only in one direction for fastening to the second part.

Therefore, the object of the present invention is to improve upon a device for fastening a first part to a stationary second part such that the first part is held securely in a predetermined open position and can also be attached easily and securely to the second part.

SUMMARY OF THE INVENTION

It is, therefore, an object of the present invention to provide a device for fastening a first part to a stationary second part, in particular to a part of a vehicle, with a fastening element which can be connected to the first part and has at least one locking element arranged so it cannot be lost, and it can be brought into a locked position joining the first part to the second part and can also be brought into an unlocked position releasing the first part from the second part, wherein the fastening element has at least one mounting part, which supports the locking element and is connected to the first part in such a way that it can pivot about a pivot axis.

The special advantage of this invention is that the fastening element permits a detachable joining while also allowing a defined pivotability of the first part to the second part. After secure locking of the first part in the area of an edge of the second part by means of the locking element, the first part can assume an open position due to its inherent weight, in which position the first part extends essentially in the vertical direction, so that the devices arranged on the first part can be connected to the supply means in the opening of the second part. Advantageously, fastening elements are arranged on opposite edge sides of the first part, so that the first part can be brought into an open position regardless of side. This greatly simplifies handling when installing or replacing the first part. Furthermore, the device according to this invention makes it possible for the movement of the first part out of the open position into the closed position to be ended with operation of the locking element on the opposite side, so that rapid and reliable assembly of the first part on the second part is made possible.

According to an advantageous embodiment of this invention, pivotability between the first part and a mounting part connected to the second part so it cannot be lost is created by a hinge-like joint that extends in the edge area of the first part. This permits easy pivotability, which exposes a large open cross section and permits complete accessibility to the rear side of the first part.

According to one embodiment of this invention, the mounting part is brought into engagement on the edge of the second part by means of a screw guided through a guide bore of the mounting part. An end stop mounted on the free end of the screw causes the screw to be held securely on the mounting part. At least two stops of different heights with a distance between them project on a top side of the mounting part facing the second part. In cooperation with the end stop, these stops form a simple locking and unlocking mechanism which brings a lock nut into screw engagement with the screw in a locked or unlocked position. By turning the screw in one direction, e.g., by turning it clockwise, the lock nut can be turned from a defined unlocked position into a defined locked position. By turning the screw in the opposite direction, the lock nut can be turned back into the unlocked position.

According to one embodiment of this invention, an unwanted reversing turning of the lock nut from a partially locked position, where the first part is loosely attached to the second part, into the locked position is prevented by a stop matched to the pitch of the screw and arranged on the mounting part of the fastening element.

According to another embodiment of this invention, the fastening element is designed with a cube shape and has a bottom part engaged in an edge recess in the first part. The bottom part is preferably held securely by locking it in the edge recess. In an alternative embodiment, the bottom part may also be connected on one piece to the first part.

According to a preferred embodiment of this invention, a mounting arm projects away from the mounting part in the direction of the hinge-connected first part, where the free end of the mounting arm is hinge-connected to the first part. The second part is thus advantageously arranged at a distance from the edge of the first part, so that room for unhindered pivotability of the first part is created. In particular, the mounting part can then be arranged above a gap between adjacent first parts, so that no additional boreholes need be provided in the first part for driving a screw.

According to an embodiment of this invention, the mounting arm is designed with a curvature so that sufficient rigidity or stability of the mounting part is guaranteed.

According to an embodiment of this invention, the mounting arm has a guide bore in a middle section for guiding the screw and has two parallel mounting arms in adjacent outer sections. Due to the spaced arrangement of the mounting arms, an intermediate space is formed, so that unhindered access is made possible for an operating element such as a screwdriver for operating the screw.

According to another embodiment of this invention, the mounting part is designed in two parts, where one insertion part is engaged in a locked position in a receptacle part. The two-piece design also means that the insertion part connected to the first part can still be used even with faulty mounting of the mounting part on the second part, thus destroying the receptacle part or the screw, for example. Easy replacement of the defective receptacle part is ensured due to the fact that the connection is just a snap-lock connection. In addition, assembly time can be shortened and material can be saved.

According to one embodiment of this invention, the insertion part is engaged in the receptacle part with some play in the transverse direction so that tolerance can be compensated in the transverse direction. This permits stress-free assembly of the first part on the second part. This also counteracts a build up of stress in the intended position of the first part during the operating lifetime of the vehicle, an aircraft in particular.

According to one embodiment of this invention, profiled rails with different profiles are provided as the second part for the opposite edge sides of the first part, where a first profiled rail allows a displacement of the mounting part with respect to the profiled rail in the transverse direction by a predetermined length, while the other profiled rail has locking webs that permit an accurate seating of the mounting part relative to the profiled rail in the transverse direction. Thus, one edge side of the first part is connected to its respective profiled rail so it cannot be lost. Since this profiled rail is hinge connected to the first part by the mounting part, a tolerance in the transverse direction can also be compensated in this area in the closed position of the first part. The mounting parts hinge connected to the edge sides of the first part are preferably designed to be the same, which has the effect of simplifying assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitive of the present invention, and wherein:

FIG. 3: a partial view through the first part along line III—III according to FIG. 2;

FIG. 4: a perspective diagram of the fastening element in a closed position, where a locking element is in an unlocked position;

FIG. 5: a view of the fastening element from above in a closed position, where the locking element is in the unlocked position;

FIG. 6: a cross section through the fastening element along line VI—VI in FIG. 5;

DETAILED DESCRIPTION OF THE INVENTION

A device described below for fastening parts may be used in aircraft, for example, where an aircraft panel is locked on an existing carrying part. Furthermore, the device according to this invention can be used for fastening panels in rail vehicles, in particular buses.

Figure 1:
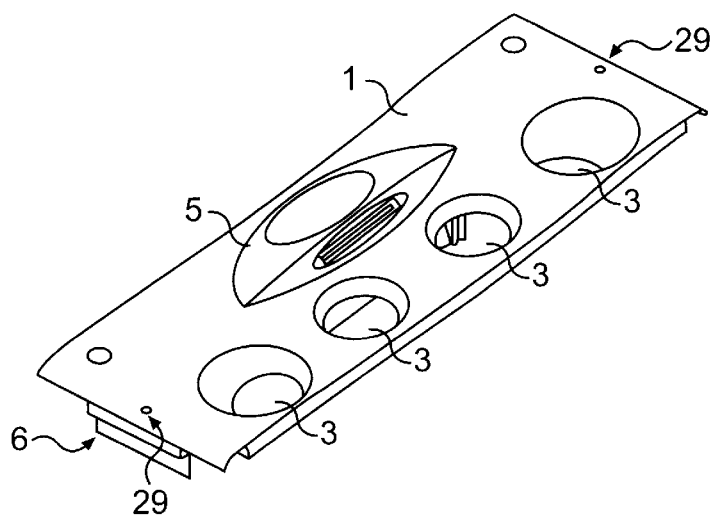
FIG. 1: a perspective diagram of a first part with fastening elements arranged on opposite sides.
Figure 2:
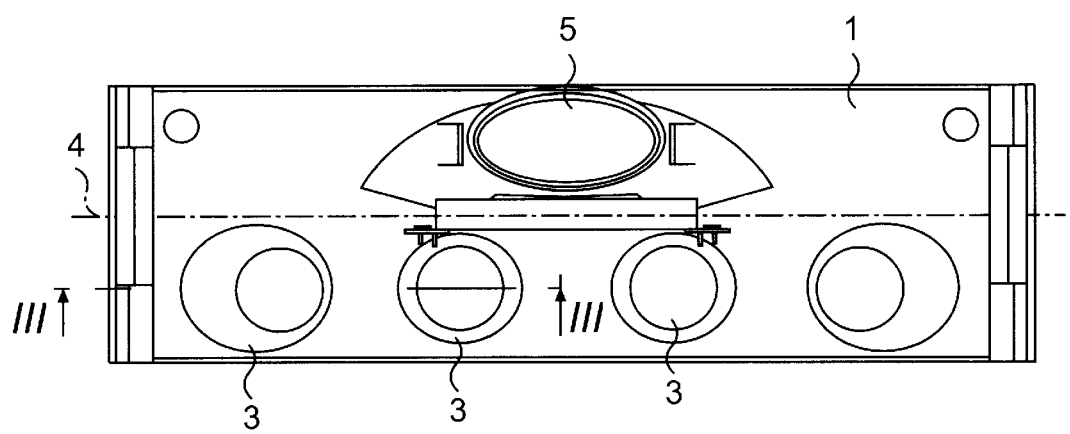
FIG. 2: a rear view of the first part.
Figure 7:
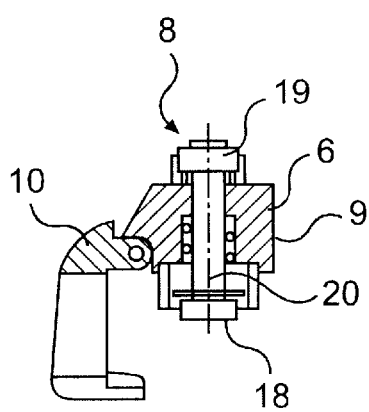
FIG. 7: a cross section through the fastening element according to FIG. 6 in an open position of the fastening element.
Figure 8:
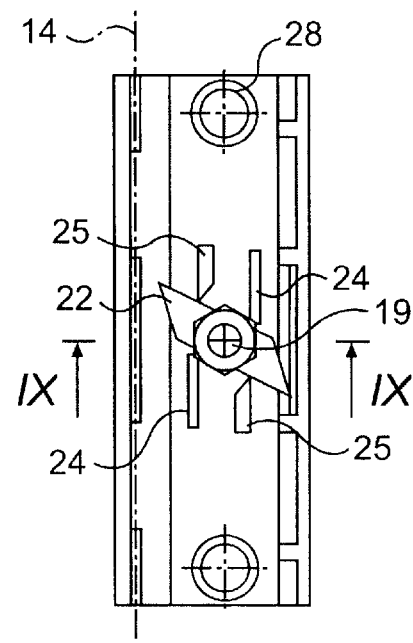
FIG. 8: a view of the fastening element from above, showing the locking element in a locked position.
Figure 9:
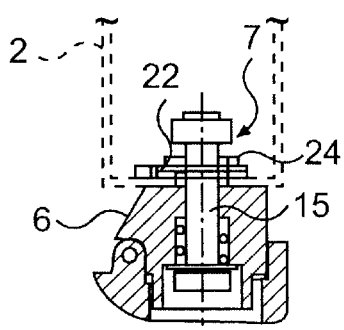
FIG. 9: a cross section through the fastening element along line IX—IX in FIG. 8, where the fastening element is in the closed position.

FIG. 1 shows an aircraft panel as a first part 1, which is secured above the row of seats on a carrying part as second part 2. The panels, which are preferably arranged side by side, form a ceiling wall of the interior of the aircraft.

The first part 1 shown in FIG. 1 is manufactured as a plastic part and has several openings 3 for reading lights; reading lights (not shown) can be inserted into these openings. Alternatively, one or more of these openings 3 may also be used for an air jet. The openings 3 extend in succession on one side of a longitudinal center plane 4 of the first part 1. On the other side of the longitudinal center plane 4, a recess 5 is arranged for inserting a loudspeaker. The first part 1 is attached to the second part 2 on the narrow sides by means of a fastening element 6. To this end, access openings 29 are provided in the first part, permitting access to the fastening element 6.

The second part 2 is designed as a c-shaped section having a horizontal slot 7 pointing downward. FIG. 3 shows the fastening element 6 in a closed position where it is locked by a locking element 8 on the second part 2 in the locked position.

As shown in FIGS. 4 through 6, the fastening element 6 is designed in a cube shape and has a top part 9 facing the second part 2, and a bottom part 10 facing the first part 1, whereby the top part 9 and bottom part 10 are arranged displaceably to one another. The longitudinal extent of fastening element 6 is parallel to the longitudinal extent of the c-shaped second part 2. The bottom part 10 is inserted with a snap catch into a groove-shaped receptacle 11 in the first part 1 before the first part 1 is assembled on the second part 2. As an alternative, the bottom part 10 may also be designed in one piece with the first part 1.

For pivoting of the bottom part 10 relative to the top part 9, there is a hinge 12 with a continuous pin 13 with which the bent tabs of the top part 9 and bottom part 10 are in contact. As an alternative, another type of joint may also be used to permit pivoting of the top part 9 relative to the bottom part 10 by at least 45 degrees, preferably 90 degrees. The pin 13 also forms a pivot axis 14 about which the top part 9 and the bottom part 10 can be pivoted relative to one another.

To lock the locking element 8 or the first part 1 on the second part 2, the locking element 8 has a screw 15 with a shaft 17 passing through a guide bore 16 in the top part 9, with a head 18 provided on the free end of the shaft facing the bottom part 10, and an end stop 19 provided on the opposite free end. Thus, screw 15 is arranged on top part 9 so it cannot be lost. A spring 20 under bias tension, extends between the head 18 of the screw 15 and stop surface of a recess 21 of the top part 8 along the screw 15, causes a downward spring force acting on the screw 15.

Furthermore, the locking element 8 has a lock nut 22 which is in screw engagement with the shaft 17 and extends between a top side 23 of the top part 9 and the end stop 19. If the locking element 8 is in an unlocked position, the elongated lock nut 22 extends in an interrupted groove 26 formed by a high first stop 24 and a low second stop 25. In this position of the lock nut 22, the fastening element 6 can be brought in contact with the second part 2, with lock nut 22 being positioned inside slot 7 in the second part 2. The width of slot 7 is selected so that the end stop 19 as well as the stops 24 and 25, which are in contact with the lock nut 22, can engage in slot 7.

Stops 24 and 25 are arranged in pairs in parallel with one another. They extend at an offset to one another and in succession, forming a transverse groove 27 in which the lock nut 22 is held in the locked position. The transverse groove 27 extends across groove 26 and across the fastening element 6. In the unlocked position of the locking element 8, long sides of the lock nut 22, which is in the shape of a parallelogram, are in contact with the inner longitudinal sides of the first stops 24 and with the narrow sides in contact with the upright narrow sides of the second stops 25 in some areas.

Assembly of the first part 1 on the second part 2 is described below. After the fastening element 6 has been fixedly attached to the narrow sides of the first part 1, the first part 1 is attached to a first narrow side of the second part 2 via the fastening element 6. To this end, the fastening element 6 is in contact with the outside surfaces of the c-shaped second part 2, with surface contact of the top side 23 of the top part 9, where the stops 24 and 25 and lock nut 22 engage in slot 7 of the second part 2. By lifting the screw 15 with the head 18 coming in contact with a lower shoulder of the top part 9 against the force of the spring 22, while at the same time turning the screw 15 by about 60 degrees, the lock nut 22 is brought into a partially locked position in which it is held in the transverse groove 27. By releasing the operating force, the lock nut 22 is in contact with an inside portion of the c-shaped second part 2. For engaging an operating means, in particular a screwdriver, the bottom part 10 has a recess. Due to the fact that both the first stop 24 and the second stop 25 have a greater height than the thickness of the c-shaped second part 2 and the thickness of the lock nut 22, an unwanted further turning or reversal of the lock nut 22 due to vibration is prevented. The second stop 25 preferably has a height such that after turning the lock nut 22 out of the unlocked position into the partially locked position, the lower edge of the lock nut 22 is a smaller distance from the top side 23 than the top edge of the second stop 25. The height of the second stop 25 is matched to the pitch of the screw 15, so that after turning the screw 15 in the transverse position (partially locked position), the lock nut 22 is moved beneath the top edge of the second stop 25. In this way, the lock nut 22 is held securely in the partially locked position even in the absence of a spring 20.

Then due to the inherent weight of the first part 1, it is pivoted about the pivot axis 14 into a vertical position together with the bottom part 10. The hinge 12 and the pivot axis 14 are arranged in an area of the first part near the edge, so that the first part 1 can easily be brought automatically into the vertical position. Then the parts to be connected to the first part such as reading lights and the like can be installed. The rear side of the first part 1 is then accessible.

Figure 10:
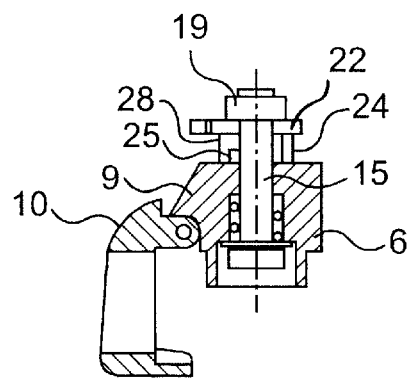
FIG. 10: a cross section through the fastening element in an open position, where a screw of the locking element has been moved axially to bring the locking element out of the unlocked position into the locked position.
Figure 11:
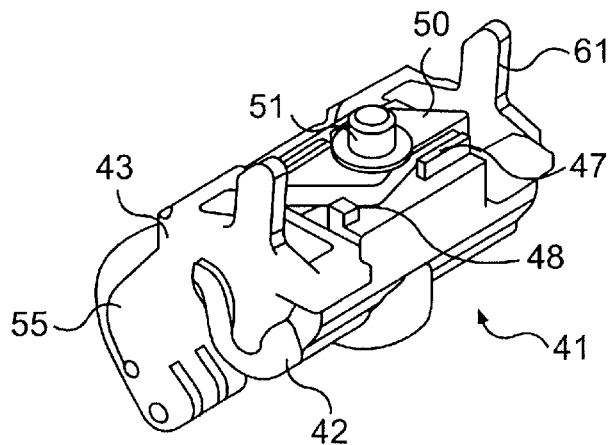
FIG. 11: a perspective diagram of a fastening element according to a second embodiment.
Figure 12:
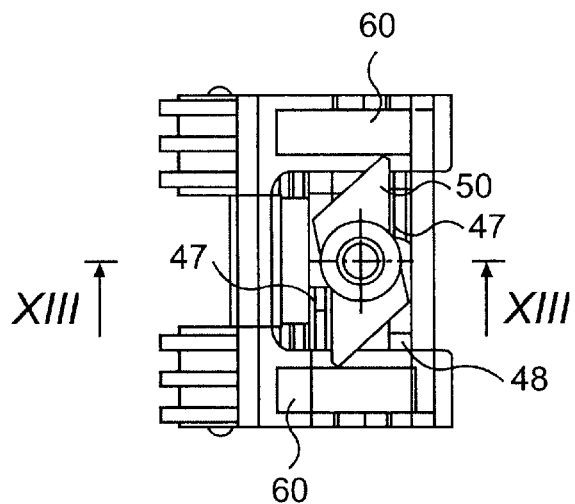
FIG. 12: a top view of the fastening element according to FIG. 11.
Figure 13:
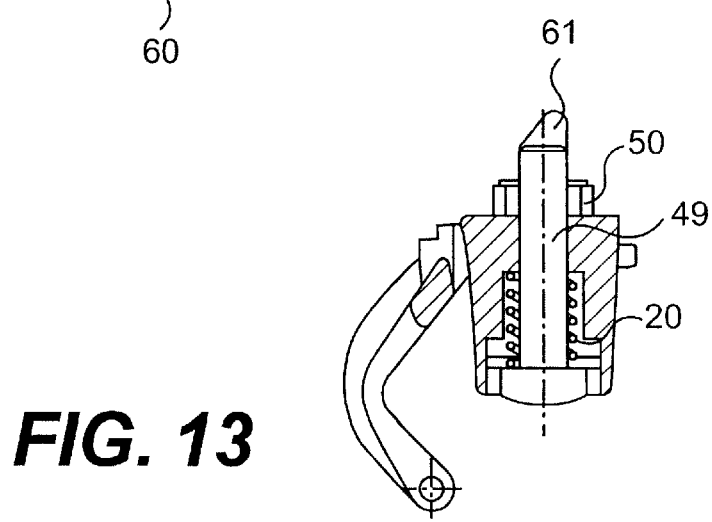
FIG. 13: a cross section through the fastening element along line XIII—XIII in FIG. 12.

Cylindrical guide bolts 28 are provided In the area of the ends of the elongated top part 9, projecting from the top side 23 and serving as a guide for the top part 9 in the second part 2 which is designed like a rail. In this way, the second parts 2, which are arranged in succession, can easily be displaced along the first part 1 and brought into the final position. In this position, the lock nut 22 is brought into the locked position by turning it further in the same direction, in the present case of a right-handed thread of screw 15, by turning it clockwise. In this position, the lock nut 22 is in contact with the top side 23 and the head 18 is in contact with the corresponding shoulder of the recess 21 of the top part 9, so that the first part 1 is in non-positive contact with the second part 2. The first stop 24 prevents further turning of lock nut 22, as does turning the lock nut 22 into the partially locked position. To this end, the first stop 24 has a greater height than the inside distance between the end stop 19 and the top side 23 minus the thickness of the lock nut 22 when the screw 15 is in the top position according to FIG. 10.

After the fastening element 6 is finally locked on one side of the first part 1, the first part 1 can be brought into a horizontal position by pivoting it about pivot axis 14. An identical fastening element 6 (not shown) is arranged on the opposite narrow side of the first part 1. With engagement of the lock nut 22 of this fastening element 6 in the corresponding slot 7 of the second part 2, the opposite side of the first part 1 is similarly in non-positive engagement with the corresponding profile part 2. Assembly of the first part 1 on the second part 2 is now concluded.

The width of slot 7 is preferably somewhat larger than the outside diameter of the guide bolts 28. This permits some play in the transverse direction of the fastening element 6 in the partially locked position, so that displacement of the fastening element 6 is made possible even when adjacent rail-shaped second parts 2 are arranged side by side and offset from one another.

Due to the fact that the stops 24, 25 are arranged in pairs, two stop faces or edges are formed, so the rotational forces acting at the engagement points are reduced by one half.

In contrast with the previous embodiment, the mounting part 41 in a second embodiment according to FIGS. 11 through 18 consists of two parts, namely a receptacle part 42 and an insertion part 43. The receptacle part 42 has a center section 44 and an adjacent outer section 45. In agreement with the first embodiment, the center section 44 has a guide bore 46 and on a top side two pairs of stops 47 and 48 similarly arranged diametrically to the guide bore 46, serving to lock the locking element in the same way. In agreement with the first embodiment, the locking element is designed as a screw 49 which is provided with a lock nut 50 and an end stop 51 in the area of the end of the shaft.

The outer section 45 of the receptacle part 42 has a trough-shaped receptacle 52 running in the axial direction, so that a bead projection 53 on the insertion part 43 can engage in the receptacle. Corresponding to the receptacle part 42, the insertion part 43 has bead projection 53 projecting laterally with a curve in an outer portion 54 and a mounting arm 55 projecting laterally with a curve, with axial bores provided on its free end 56 to form a hinge-like joint with a plate-shaped function panel 57. The plate shaped first function panel 57 is preferably designed as a function panel detachably mounted in the ceiling area of an aircraft. A pivot axis 58 passes through the axial bores with the function panel portion 57 mounted on it to pivot to the mounting part 41.

The outer portion 54 of the insertion part 43 are joined in an upper edge area of the mounting arms 55 by means of a connecting web 59. A base part 60 with guide pins 61 projecting upward is in contact with a topside of the bead projections 53. The base part 60 has snap lock means so that the bead projection 53 is mounted in receptacle 52 of the receptacle part 42. The open angle of the receptacle 52 which has a wedge-shaped cross section is selected to be larger than the corresponding wedge shape of the bead projection 53, so that insertion part 43 is held in the receptacle part 42 with some play in the transverse direction. This permits a stress-free means of locking the function panel 57 in the area of opposing edge sides 62 of the function panel 57 on a second part 63, which is formed as a profile rail. Snap lock elements (not shown) cause the insertion part 43 to turn only by applying a predetermined force about an axis of rotation 64 with respect to the receptacle part 42. The angular turning range amounts to a few degrees. Even after assembly, compensation of tolerance can be achieved in this way.

As an alternative, mounting part 41 can also be designed in one piece. However, the two-piece design offers the advantage that by non-proper use of the screw 49, which leads to destruction of the screw, only the receptacle part 42 needs to be replaced. The insertion part 43 can also be connected to the function panel 57.

Figure 14:
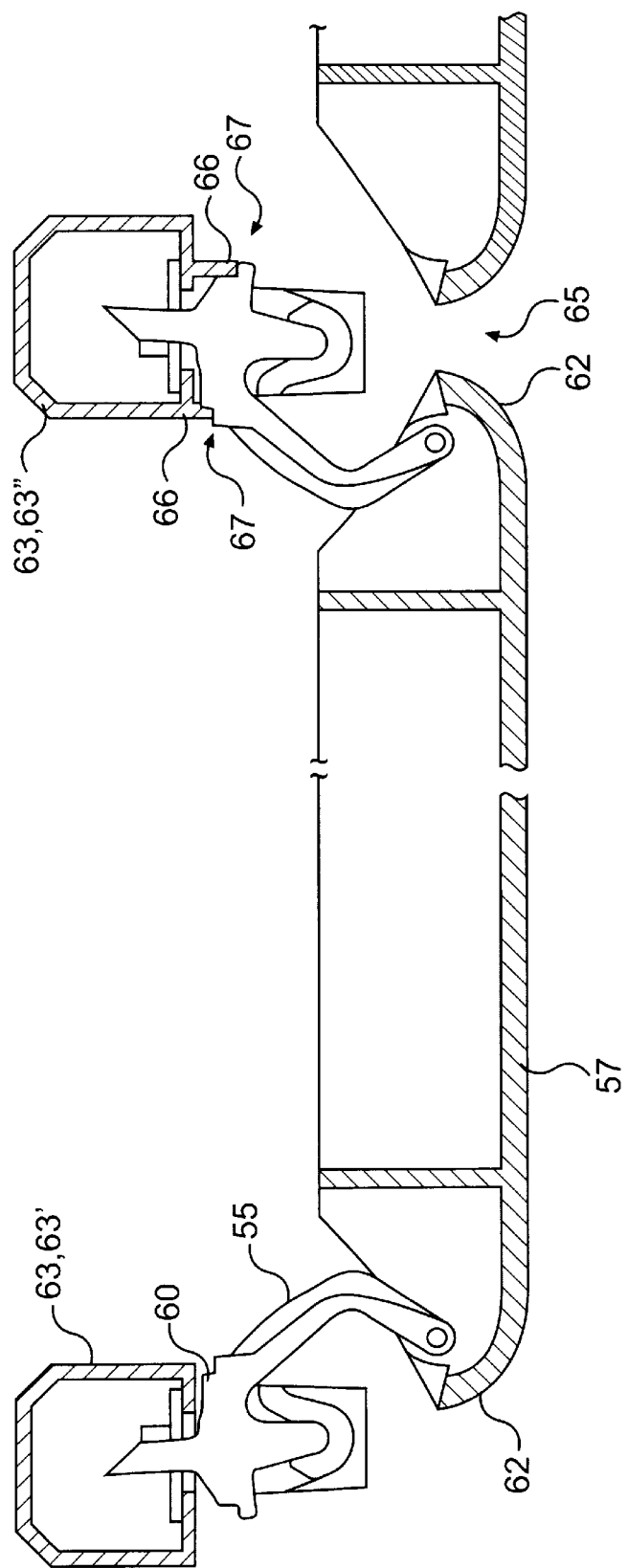
FIG. 14: a cross section through a first part connected to a second part on opposite edge sides, where one fastening element is provided for each of the edge sides and is in a locked position.
Figure 15:
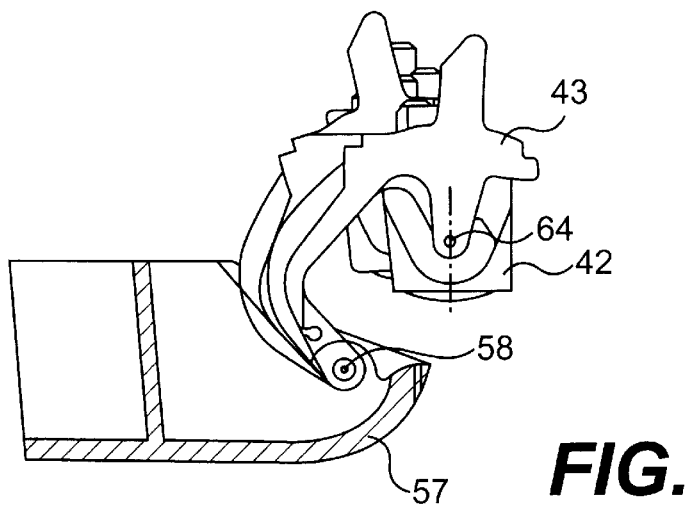
FIG. 15: a view of the fastening element which is hinge connected to the first part, as seen in the axial direction, with an insertion part which is shown in two positions, pivoted in the transverse direction toward a receptacle part of the fastening element.
Figure 16:
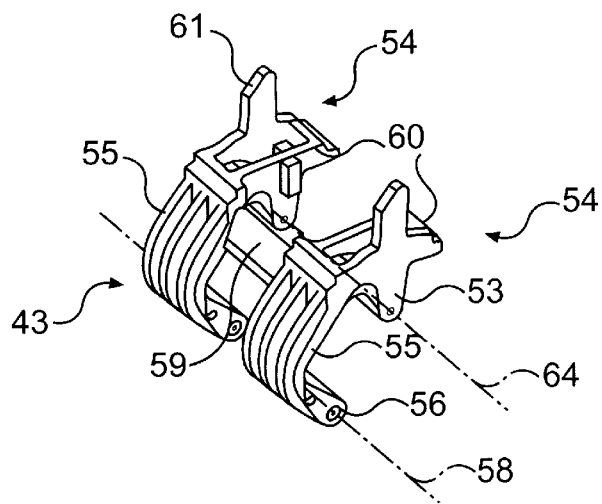
FIG. 16: a perspective diagram of the insertion part as seen from above.
Figure 17:
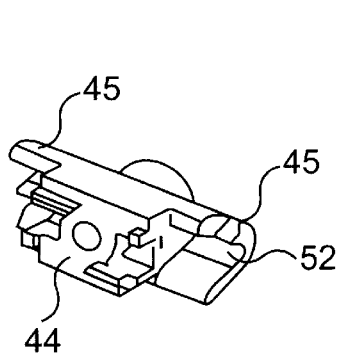
FIG. 17: a perspective diagram of the receptacle part as seen from above.
Figure 18:
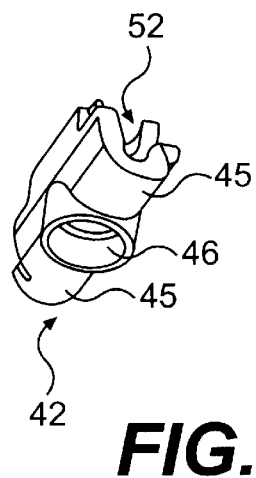
FIG. 18: a perspective diagram of the receptacle part as seen from beneath.

As shown especially well in FIG. 14, the mounting arm 55 projecting away from the base part 60 makes it possible to pivot the function panel 57 from a plane parallel to the profile rail 63 and into a perpendicular plane, after loosening the edge side 62 of the mounting part 41. Due to the fact that the mounting arms 55 project on a side of the base part 60 facing the extension of the function panel 57, a gap 65 formed between adjacent function panels 57 can be used to gain access to the screw 49 by means of an operating element. A through hole in the function panel 57 itself can be avoided in this way.

To permit a compensation of tolerance in the transverse direction to the pivot axis 58 and the axis of rotation 64, the profile rails 63 provided for the function panel 57 are designed differently. A first profile rail 63 is designed to be essentially c-shaped and in the locked position its free ends are between the lock nut 50 and a top side of the receptacle part 42 or the insertion part 43. A profile rail 63' provided for the opposite edge side 62 of the function panel 57, is also designed to be c-shaped, but it also has locking webs 66 projecting across the ends and engaging in step-shaped receptacles 67 of the base part 60 near the edge, preventing a relative transverse movement between the receptacle part 42 and the profile rail 63". The mounting part 41 is attached on the profile rail 63' and on the profile rail 63" in the manner of a movable bearing or a fixed bearing in the transverse direction, creating a tolerance compensation of approximately +/−2 mm because of the distance between the free ends of the profile rail 63'.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for fastening a first part to a stationary second part with a fastening element which can be connected to the first part and has at least one locking element captively arranged and can be brought into a locked position joining the first part to the second part and can also be brought into an unlocked position releasing the first part from the second part, wherein the fastening element has at least one mounting part which supports the locking element and is connected by a hinged joint to the first part in such a way that the first part can pivot about a pivot axis, the pivot axis extending in the area of a first edge of the first part, and the joint extending perpendicular to the plane of action of the locking element; and wherein the locking element has a screw extending through a guide bore in the mounting part with a head and a shaft, where an end stop is provided for the free end of the shaft and where the head is arranged on a side of the guide bore facing the first part, a lock nut is arranged on the shaft so it can be turned on a side of the guide bore facing the second part, and at least two stops are arranged on a top side of the mounting part facing the second part so that the lock nut can be brought automatically into the locked position by turning the screw and can also be brought into the unlocked position.

2. A device for fastening a first part to a stationary second part with a fastening element which can be connected to the first part and has at least one locking element captively arranged and can be brought into a locked position joining the first part to the second part and can also be brought into an unlocked position releasing the first part from the second part, wherein the fastening element has at least one mounting part which supports the locking element and is connected to the first part in such a way that the first part can pivot about a pivot axis, and wherein the locking element has a screw extending through a guide bore in the mounting part with a hand and a shaft, where an end stop is provided for the free end of the shaft and where the head is arranged on a side of the guide bore facing the first part, a lock nut is arranged on the shaft so it can be turned on a side of the guide bore facing the second part, and at least two stops are arranged on a top side of the mounting part facing the second part so that the lock nut can be brought automatically into the locked position by turning the screw and can also be brought into the unlocked position.

3. The device according to claim 2, wherein the stops are elongated in design and extend parallel to the pivot axis.

4. The device according to claim 2, wherein at least two stops project with a distance between them away from the top side of the mounting part with stop edges or stop faces for coming in contact with the lock nut with the movement thereof into the locked position and into the unlocked position.

5. The device according to claim 2, wherein the stops have different heights, with a first stop which is arranged at a rear portion of the fastening element in the direction of turning when the lock nut is turned from the unlocked position into the locked position being designed to be higher than a second stop arranged at a front portion of the fastening element in the direction of turning, and the first stop has a greater height than the inside distance of the end stop from the top side of the mounting part minus the thickness of the lock nut in an upper end position of the screw with the head in contact with the underside of the mounting part.

6. The device according to claim 2, wherein the second stop has a height matched to the pitch of the screw such that after turning the lock nut out of the unlocked position into the locked position, a lower edge of the lock nut is moved beneath an upper edge of the second stop.

7. The device according to claim 2, wherein the screw is under an initial tension due to a spring pushing it into a lower position, and the locking element can be brought from the unlocked position into the locked position by moving the screw against the force of the spring.

8. The device according to claim 2, wherein the mounting part is designed as a top part facing the second part, the mounting part being designed to pivot about the pivot axis to a bottom part facing the first part, and wherein the bottom part is part of the first part or is detachably connected to the first part.

9. The device according to claim 2, wherein the pivot axis extends along an edge of the bottom part and a through hole connects with the edge of the bottom part across a plane planar to the pivot axis, to accommodate the screw.

10. The device according to claim 2, wherein the mounting part is cube shaped, with the bottom part being held in a receptacle in the first part.

11. The device according to claim 2, wherein a mounting arm projects away from the mounting part in the direction of a hinge-connected edge side of the first part, where the joint is arranged on a free end of the mounting arm.

12. The device according to claim 11, wherein the mounting arm extends essentially parallel to the screw on a side of the mounting part facing the hinge-connected edge side of the first part, where the free end of the mounting arm is arranged at a predetermined axial and radial distance from the screw.

13. The device according to claim 11, wherein at least two mounting arms running axially with an offset are provided, each having a curved design.

14. The device according to claim 11, wherein the mounting arm projects away from the mounting part in an outer section thereof adjacent to a central section having the guide bore.

15. The device according to claim 11, wherein the mounting part is designed in two parts with a receptacle part which has the guide bore and is snap connected to an insertion part having the mounting arm.

16. The device according to claim 11, wherein a receptacle part has stops in a central section and in an adjacent outer section having a trough-shaped receptacle in which an insertion part is engaged with a bead projection with some play in the transverse direction.

17. The device according to claim 11, wherein the first part is designed as a plate connected in an articulated manner to corresponding mounting arms of insertion parts, and a receptacle part is arranged in alignment with a gap formed between the edge sides of adjacent first parts.

18. The device according to claim 11, wherein a profile rail, provided for a first edge side of the first part connected by the mounting part, is designed to be c-shaped, and a second profile rail, provided for an opposite edge side of the same first part connected by the mounting part, is designed to be c-shaped, forming at least one projecting locking web, where the locking web engages in a receptacle of the mounting part to rigidly mount the mounting part on the profile rail in the transverse direction.

19. The device according to claim 2, wherein the pivot axis extends in the area of a first edge of the first part.

20. The device according to claim 2, wherein the mounting part is connected by a hinged joint to the first part.

21. The device according to claim 20, wherein the hinged joint extends perpendicular to the plane of action of the locking element.

* * * * *